United States Patent
Voelz et al.

(10) Patent No.: US 11,580,795 B2
(45) Date of Patent: Feb. 14, 2023

(54) METHOD AND A DEVICE FOR PROVIDING AN OPERATING STATE OF A SENSOR OF A VEHICLE

(71) Applicant: Robert Bosch GmbH, Stuttgart (DE)

(72) Inventors: Benjamin Voelz, Leonberg (DE);
Matthias Maier, Weissach (DE);
Matthias Haug, Renningen (DE);
Michael Gabb, Gaeufelden (DE);
Ruediger-Walter Henn, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 393 days.

(21) Appl. No.: 16/867,957

(22) Filed: May 6, 2020

(65) Prior Publication Data

US 2020/0372732 A1    Nov. 26, 2020

(30) Foreign Application Priority Data

May 20, 2019   (DE) .......................... 102019207365.4

(51) Int. Cl.
*G07C 5/08*        (2006.01)
*G01S 13/931*    (2020.01)
*G07C 5/00*        (2006.01)

(52) U.S. Cl.
CPC .......... *G07C 5/0808* (2013.01); *G01S 13/931* (2013.01); *G07C 5/008* (2013.01); *G07C 5/0816* (2013.01)

(58) Field of Classification Search
CPC .............................. G07C 5/0808; G07C 5/081
See application file for complete search history.

(56) References Cited

U.S. PATENT DOCUMENTS

| 10,262,475 B2 * | 4/2019 | Smith | ..................... G07C 5/008 |
| 10,621,855 B2 * | 4/2020 | Verhoeven | ........... G08B 29/185 |
| 11,358,604 B2 * | 6/2022 | John | .................. B60W 50/0205 |
| 2021/0103050 A1 * | 4/2021 | McEwan | ................... G01S 3/74 |

FOREIGN PATENT DOCUMENTS

DE     102018101110 A1    7/2018

* cited by examiner

*Primary Examiner* — Peter D Nolan
*Assistant Examiner* — Jacob Kent Besteman-Street
(74) *Attorney, Agent, or Firm* — Norton Rose Fulbright US LLP; Gerard Messina

(57) ABSTRACT

A method and a device for providing an operating state of a sensor of a vehicle. The method includes detecting first environment data values using the sensor, the first environment data values representing an environment of the vehicle, receiving second environment data values, which represent the environment of the vehicle, the second environment data values being detected by an infrastructure sensor system, determining the operating state of the sensor as a function of the first and the second environment data values, and providing the operating state of the sensor.

4 Claims, 1 Drawing Sheet

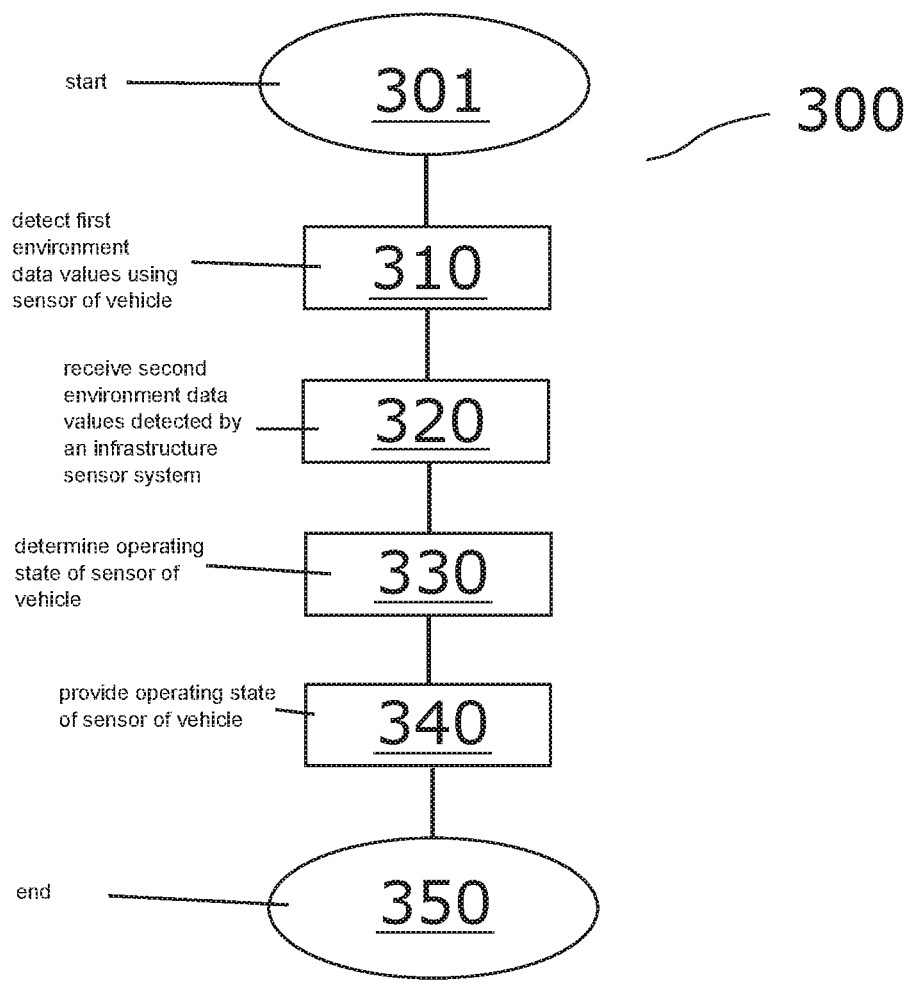

METHOD AND A DEVICE FOR PROVIDING AN OPERATING STATE OF A SENSOR OF A VEHICLE

CROSS REFERENCE

The present application claims the benefit under 35 U.S.C. § 119 of German Patent Application No. DE 102019207365.4 filed on May 20, 2019, which is expressly incorporated herein by reference in its entirety.

FIELD

The present invention relates inter alia to a method for providing an operating state of a sensor of a vehicle including a step of detecting first environment data values using the sensor, a step of receiving second environment data values, a step of determining the operating state of the sensor as a function of the first and the second environment data values, and a step of providing the operating state of the sensor.

SUMMARY

An example method according to the present invention for providing an operating state of a sensor of a vehicle comprises a step of detecting first environment data values using the sensor, the first environment data values representing an environment of the vehicle, and a step of receiving second environment data values, which represent the environment of the vehicle, the second environment data values being detected by an infrastructure sensor system. The example method furthermore comprises a step of determining the operating state of the sensor, as a function of the first and the second environment data values, and a step of providing the operating state of the sensor.

A detection of first environment data values is to be understood for example in the sense that these first environment data values are detected by an environment sensor system of the vehicle, the first environment data values representing environmental features of the environment of the vehicle at the time of the detection. An environmental feature is to be understood for example as a traffic sign and/or an infrastructure device (tunnel, bridge, guardrail, boundary markings of a lane, structural roadway delimitations, street lights, etc.) and/or a building and/or a road condition (pot holes, wet or icy patches, etc.) and/or other environmental features.

An environment sensor system is to be understood for example as at least one video sensor and/or at least one radar sensor and/or at least one LiDAR sensor and/or at least one ultrasonic sensor and/or at least one additional sensor that is designed to detect an environment of the vehicle, in particular in the form of first environment data values. In one specific embodiment, the environment sensor system additionally comprises for example evaluation means (processor, working memory, hard disk, software), which are designed to evaluate the environment data values and thus to detect and/or to determine for example individual environmental features in the environment of the vehicle. An environment is to be understood here for example as the area the environment sensor system is able to detect. This may be for example a section of a traffic route and/or of a traffic intersection, etc. The sensor of the vehicle, whose operating state is provided on the basis of the method, is to be understood for example as one or several of the above-mentioned sensors and/or the entire environment sensor system.

An infrastructure sensor system is to be understood as at least one sensor, which is comprised by an infrastructure unit such as for example a traffic signal (sign, traffic light, etc.) and/or a structural device (tunnel wall, bridge pillar, guard rail, etc.) and/or other developments of the infrastructure. The at least one sensor is to be understood for example as at least one video sensor and/or at least one radar sensor and/or at least one LiDAR sensor and/or at least one ultrasonic sensor and/or at least one additional sensor that is designed to detect an environment of the vehicle, in particular in the form of second environment data values.

Providing the operating state is to be understood for example as outputting a signal to a further device (control unit, communication device, navigation device, safety device, etc.), the signal comprising the operating state and/or an execution instruction, as a function of the operating state, to this further device. An execution instruction is to be understood for example as an instruction as to how the operating state must be handled or what influence the operating state has on this further device.

The example method according to the present invention advantageously achieves the objective of providing an operating state of the sensor and thus in a certain respect also an operating state of the vehicle. The sensor system in the vehicle, in particular for detecting the environment, is by now of enormous significance. Especially automated driving is unthinkable without this type of sensor system. Many functions in the vehicle, which are responsible for example for the safety of the vehicle or the safety of the occupants and/or for the navigation of the vehicle, cannot be used (reliably) without this sensor system. This objective is achieved by the method according to the present invention in that the operating state of this sensor or of these sensors is checked or determined by way of reference data (here, the second environment data values) and is subsequently provided. This increases both the reliability in the use of these sensors as well as the safety of the entire vehicle.

The operating state of the sensor is preferably determined as at least temporarily faulty and/or as at least temporarily unusable if the first and second environment data values deviate excessively according to specified criteria.

An operating state of the sensor is to be understood as a state that represents for example the reliability of the data detected thereby, that is, for example, the correctness and/or completeness. For this purpose, identifiers or corresponding signals stored by the device are used for example, which are provided following the determination of the respective operating state and which may be accordingly evaluated or interpreted for example by the above-mentioned further device. An at least temporarily faulty sensor is to be understood as a sensor that for example has failed completely and/or partially and/or must be calibrated anew. An at least partially temporarily unusable sensor is to be understood for example as a sensor that is soiled to such an extent that it is able to detect the environment of the vehicle at best partially. In another specific embodiment, an at least temporarily faulty sensor is to be understood as a sensor that is able to detect the environment of the vehicle at best partially due to weather (rain, snow, fog, solar irradiation, etc.)

Preferably, the first environment data values feature a first detection time period and/or the second environment data values feature a second detection time period, and the operating state of the sensor is determined as a function of the first detection time period and/or of the second detection time period.

A first and/or second detection time period is to be understood for example as an individual or multiple time stamp(s), which are produced when detecting the first and/or second environment data values and are comprised by the first and/or second environment data values, in addition to the respectively represented environment. In one specific embodiment, the time stamp describes exactly one point in time. In another specific embodiment, the time stamp describes a beginning and/or an end of the time period of a measurement.

An example device according to the present invention, in particular a control unit, is designed to perform all steps of the example method for providing an operating state of a sensor of a vehicle according to the present invention.

The example device is developed for example as a control unit of the vehicle and comprises a processing unit (processor, working memory, hard disk) as well as suitable software for implementing the example method according to present invention. In one specific embodiment, the device comprises a transmitter and/or receiver unit, which is designed to exchange data values in particular with an external server or a cloud and/or an infrastructure unit. In another specific embodiment, the device comprises for example additionally or alternatively a data interface in order to exchange data values with a transmitter and/or receiver unit of the vehicle. The device furthermore comprises for example a data interface for requesting environment data values that represent the environment of the automated vehicle.

Furthermore, an example computer program is provided in accordance with the present invention, comprising commands that prompt a computer, when executing the computer program, to implement a method in accordance with one of the method claims for providing an operating state of a sensor of a vehicle. In one specific embodiment, the computer program corresponds to the software comprised by the device.

Furthermore, an example machine-readable storage medium is provided in accordance with the present invention, on which the computer program is stored.

Advantageous further developments of the present invention are described herein and are shown in the FIG.

BRIEF DESCRIPTION OF THE DRAWINGS

Exemplary embodiments of the present invention are shown in the FIG. and are explained in greater detail below.

FIG. 1 shows an exemplary embodiment of the method according to the present invention in the form of a flow chart.

DETAILED DESCRIPTION OF EXAMPLE EMBODIMENTS

FIG. 1 shows an exemplary embodiment of a method 300 for providing 340 an operating state of a sensor of a vehicle. Method 300 begins with step 301.

In step 310, first environment data values are detected by the sensor, the first environment data values representing an environment of the vehicle.

In step 320, second environment data values representing the environment of the vehicle are received, the second environment data values being detected by an infrastructure sensor system.

In step 330, an operating state of the sensor is determined as a function of the first and the second environment data values.

The determination 330 of the operating state occurs for example in that the first and the second environment data values are compared to one another.

For example, distances and/or orientations of individual environmental features, which are comprised both by first as well as by the second environment data values, are compared to one another. If this yields a deviation of the distances and/or orientations that exceeds a specified critical value, the corresponding sensor is deemed to be at least temporarily faulty.

In one specific embodiment, the first environment data values feature a first detection time period and/or the second environment data values feature a second detection time period.

The determination 330 of the operating state of the sensor occurs as a function of the first detection time period and/or the second detection time period for example in that the second environment data values exhibit at least one environmental feature, which is detected particularly well or clearly, whereas the first environmental data values do not exhibit this environmental feature, as a result of which the operating state is determined to be at least temporarily unusable, for weather-related reasons for example.

In step 340, the operating state of the sensor is provided. Method 300 ends with step 350.

What is claimed is:

1. A method for providing an operating state of a sensor of a vehicle, the method comprising:
   detecting, via a sensor system of the vehicle, first environment data values representing an environment feature of an environment of the vehicle;
   requesting, via a processor and a data interface, second environment data values that represent the environment of the automated vehicle;
   receiving, via a receiver unit, the second environment data values representing the environment feature of the environment of the vehicle, the second environment data values being detected by an infrastructure sensor system, wherein the infrastructure sensor system includes at least one sensor of an infrastructure unit, including at least one of a traffic signal, a traffic sign, and/or a structural device, including at least one of a tunnel wall, a bridge pillar, and/or a guard rail;
   determining, via the processor, the operating state of the sensor system as a function of the first environment data values and the second environment data values; and
   providing, via the processor, the operating state of the sensor system, wherein the providing includes outputting a signal to a further device, including at least one of a control unit, a communication device, a navigation device, and/or a safety device, wherein the signal includes the operating state and/or an execution instruction, as a function of the operating state, to the further device, and wherein the execution instruction includes an instruction as to how the operating state is handled and/or what influence the operating state has on the further device;
   wherein the operating state of the sensor is determined, via the sensor, to be at least temporarily faulty and/or at least temporarily unusable when the first environment data values deviate from the second environment data values according to specified criteria, and wherein the environmental feature includes a traffic sign, and/or a building, and/or a road condition, and/or an infrastructure device, including a tunnel, a bridge, a guardrail, a boundary marking of a lane, a structural roadway delimitation, and/or a street light.

2. The method as recited in claim 1, wherein the first environment data values are detected during a first detection time period and/or the second environment data values are detected during a second detection time period, and wherein the determination of the operating state of the sensor occurs as a function of the first detection time period and/or of the second detection time period.

3. A device, comprising:
a control unit having a processor to provide an operating state of a sensor of a vehicle, by performing the following:
  detecting, via a sensor system, first environment data values representing an environment feature of an environment of the vehicle;
  requesting, via the processor and a data interface, second environment data values that represent the environment feature of the environment of the automated vehicle;
  receiving, via a receiver unit, the second environment data values representing the environment of the vehicle, the second environment data values being detected by an infrastructure sensor system, wherein the infrastructure sensor system includes at least one sensor of an infrastructure unit, including at least one of a traffic signal, a traffic sign, and/or a structural device, including at least one of a tunnel wall, a bridge pillar, and/or a guard rail;
  determining, via the processor, the operating state of the sensor system as a function of the first environment data values and the second environment data values; and
  providing, via the processor, the operating state of the sensor system, wherein the providing includes outputting a signal to a further device, including at least one of a control unit, a communication device, a navigation device, and/or a safety device, wherein the signal includes the operating state and/or an execution instruction, as a function of the operating state, to the further device, and wherein the execution instruction includes an instruction as to how the operating state is handled and/or what influence the operating state has on the further device;
  wherein the operating state of the sensor is determined, via the sensor, to be at least temporarily faulty and/or at least temporarily unusable when the first environment data values deviate from the second environment data values according to specified criteria, and wherein the environmental feature includes a traffic sign, and/or a building, and/or a road condition, and/or an infrastructure device, including a tunnel, a bridge, a guardrail, a boundary marking of a lane, a structural roadway delimitation, and/or a street light.

4. A non-transitory machine-readable storage medium having a computer program, which is executable by a processor, comprising:
a program code arrangement having program code for providing an operating state of a sensor of a vehicle, by performing the following:
  detecting, via a sensor system, first environment data values using the sensor system of the vehicle, the first environment data values representing an environment feature of an environment of the vehicle;
  requesting, via the processor and a data interface, second environment data values that represent an environment feature of the environment of the automated vehicle;
  receiving, via a receiver unit, second environment data values representing the environment of the vehicle, the second environment data values being detected by an infrastructure sensor system, wherein the infrastructure sensor system includes at least one sensor of an infrastructure unit, including at least one of a traffic signal, a traffic sign, and/or a structural device, including at least one of a tunnel wall, a bridge pillar, and/or a guard rail;
  determining, via the processor, the operating state of the sensor as a function of the first environment data values and the second environment data values; and
  providing, via the processor, the operating state of the sensor system, wherein the providing includes outputting a signal to a further device, including at least one of a control unit, a communication device, a navigation device, and/or a safety device, wherein the signal includes the operating state and/or an execution instruction, as a function of the operating state, to the further device, and wherein the execution instruction includes an instruction as to how the operating state is handled and/or what influence the operating state has on the further device;
  wherein the operating state of the sensor is determined, via the sensor, to be at least temporarily faulty and/or at least temporarily unusable when the first environment data values deviate from the second environment data values according to specified criteria, and wherein the environmental feature includes a traffic sign, and/or a building, and/or a road condition, and/or an infrastructure device, including a tunnel, a bridge, a guardrail, a boundary marking of a lane, a structural roadway delimitation, and/or a street light.

* * * * *